ABSTRACT

United States Patent Office 3,252,859
Patented May 24, 1966

3,252,859
COLLOIDAL SILICA-OIL COMPOSITION AND
METHOD OF USING SAME
Jules Silver, North Franklin, and Kurt Appel, Norwich,
Conn., assignors to Masti-Kure Company, Inc., Norwich, Conn., a corporation of Connecticut
No Drawing. Filed Oct. 24, 1962, Ser. No. 232,856
7 Claims. (Cl. 167—53.2)

This invention relates to infusion applied pharmaceutical preparations and methods for the treatment of infections in animals, more particularly bovine mastitis and metritis, and compositions of matter particularly suitable for use in and improving the effectiveness of the method of treatment.

Mastitis is a common form of infection of the mammary glands and it is particularly a problem with milk cows since a mastitis infection prevents milk from an infected cow from being marketed for commercial useage.

Also, metritis, a disease causing an infection of the uterus, is an equally important problem, particularly with dairy cows. If metritis occurs after calving it can result in a sterile animal. Such an animal which cannot conceive or cannot carry conception to final term will be lost as a milk producer. It is well known that regular yearly conception of dairy cows is essential for maintaining and fully utilizing their potential milk production.

Mastitis and metritis are the two most prevalent diseases adversely affecting productivity in the dairy industry. Improvements in the remedial treatment of these infections so that such treatment will be more effective will help to restore the animal to its designed function as a productive milk producer in shorter time. Therefore, such improvements are of utmost commercial importance.

A standard method of treating mammary gland and uterine infections in dairy animals is to infuse a treatment preparation into the mammary glands or the uterus where the infection is located. The principal medicament administered by the intra-mammary or intra-uterine route is usually one or a combination of various antibiotic drugs, organic salts or other suitable therapeutic ingredients compounded into a special infusion base.

This infusion base serves as the physical carrier or vehicle in which the therapeutic materials are transported to the site where treatment is required. It usually is made of such consistency so as to make administration of the medicament by the intra-mammary and intra-uterine routes reasonably easy and to keep all compounded therapeutic ingredients well distributed and properly suspended at all times during storage of the product. The efficiency with which the therapeutic materials can act is largely dependent on the functional performance of the vehicle into which they are compounded. Thus, for instance, therapeutic action is inhibited or retarded if a treatment preparation, after it is administered, does not allow for the complete and timely release and diffusion of its active ingredients.

Therefore, the formulation and preparation of suitable infusion carrier bases have long been major problems. Usually the vehicles used in the infusion treatment of bovine mastitis and metritis are composed of mineral oil or mineral oil emulsions or vegetable oils containing suitable suspending and consistency conditioning agents. Besides serving the function of giving the product desirable consistency these additives also are intended to aid diffusion and release of active therapeutic components from the carrier base after the treatment product has been administered.

Various additives, namely aluminum monostearate, mono-, di-, tri-fatty acid esters of esterified vegetable oils, glycerol, glycols, ethoxylated glycols and sorbitol compounds, cholesterols and cholesterol emulsifiers and polyethylene have been used as conditioning agents in these infusion bases. A few proprietary infusion vehicles for use in compounding metritis and mastitis treatment preparations have also been marketed. Examples are "Plastibase" containing polyethylene in mineral oil which is marketed by E. R. Squibb & Sons, "H.P." vehicle of Hamilton pharmacal Company which consists of a mineral oil emulsion containing cholesterol emulsifiers and a patented vehicle by Bristol Laboratories, Inc., comprising aluminum monosterate in either peanut, sesame or mineral oils. However, none of the additives used nor infusion bases prepared with them have been found by us to be fully satisfactory.

Heretofore mastitis and metritis treatment products which are administered by the intra-mammary and intra-uterine route have been more or less deficient primarily in their capacity to release the therapeutic material rapidly and efficiently into the environment where treatment is required. The problem has been that the active ingredients in the prior art mastitis and metritis treatment compositions have been tenaciously retained by the fatty vehicles in which they are suspended.

When prior art mastitis treatment compositions have been infused into the mammary glands, the treatment mass, being of an oleaginous nature and not readily miscible with water or milk, has a tendency to float on the milk produced in the mammary glands and the therapeutic ingredients are primarily retained within the floating mass. Since this floating treatment mass mostly remains at the top of the milk, and only partly adheres in spotty agglomerations to tissues, mainly tissue folds, it does not always contact the infected mammary gland tissue linings which actually must be treated. Because of this condition, veterinarians heretofore have generally recommended that manual massage be applied to the mammary gland in an attempt to distribute the therapeutic material and bring it into contact with the infected area.

Also of importance is the fact that due to the floating characteristics of prior art, mastitis treatment products, and their spotty agglomerated deposition particularly in tissue flaps, it has not been possible to readily milk out the therapeutic materials within a reasonable time after treatment. It is generally desired that the treatment product be capable of being milked out of the cow within 72 hours after being administered.

It is the primary object of the present invention to overcome the deficiency of prior art mastitis and metritis infusion treatment products by improving the drug release pattern of such products in such a manner that all active therapeutical materials can be completely liberated from their infusion carrier base and be rapidly transferred and easily diffused into the fluids of the mammary glands and the uterus into which they have been infused.

It is a further object of the present invention to obtain thorough distribution and finest dispersion of the active therapeutic ingredients over the widest possible surface area of the infected invironment while they remain dissolved and homigeneously suspended in a system of fine particle division so that most active and constant therapeutic contact with the situs of infection will be maintained, thus permitting full utilization of the therapeutic potential in the medicament.

It is still a further object of the present invention to reduce the possibility of bacteria building up a resistance to a given infused medicament. This is accomplished by quicker and complete drug release from the carrier base. By obtaining the increased impact of the substantially full initial concentration of the medicament, coupled with its fine dispersion over wider surface areas and increased surface exposure of its finely divided particles, more favorable conditions for immediate and full effect of the particular medicament are created.

In still another aspect of the present invention, the composition of matter may be readily and quickly prepared without the use of special procedures other than those specified herein and without special equipment.

A further advantage of the present invention is that the medicament may be utilized between 80 to 100 percent of its effective potential in comparison to the 30 to 50 percent effectiveness of prior art mastitis treatment products. This better utilization of the effective therapeutic potential makes it possible to attain unexpected high rates of effectiveness from therapeutic ingredients in mastitis and metritis infusion treatment formulas at reduced or minimum rather than maximum dosage levels.

Most mastitis and metritis formulations contain penicillin and other antibiotics which are sensitive to moisture. Therefore, these products are compounded as anhydrous systems.

The conditioning additives used heretofore generally have emulsifying properties which manifest themselves in the formation of water in oil emulsions when water is added to the product. This is particularly so with prior art products due to the low concentrations of these additives used in such products. Higher concentrations of emulsifiers capable of forming oil in water emulsions have been found impractical for use due to stability problems.

When a mastitis product takes up water and forms a water-in-oil emulsion it becomes a closed system which will not disperse in any further amount of water that is added. In other words, it forms a non-breakable water-in-oil emulsion. Such an emulsion will float on the top of the water and will not release the solids which are locked therein. Ingredients which are water soluble will slowly diffuse from the emulsion through the process of osmosis. Examples of such water soluble ingredients are: potassium penicillin, dihydrostreptomycin and neomycin sulfates. However, sulfonamides with form an important part in many treatment formulations are very sparingly soluble or almost insoluble and thus, their action is very inhibited through non-release.

In addition, the release pattern of the water soluble ingredients through osmosis is very slow and, therefore, the impact of the full dosage is rarely attained.

Prior art commercial attempts at mastitis and metritis treatments and compositions of matter have been directed primarily to an emulsifiable product and, as far as it is known, they have not been fully satisfactory. In contrast to the chemical approach of the emulsions, the present invention utilizes a physical approach rather than chemical compounding to effectuate efficient mastitis treatment.

In accordance with the present invention, it has been found that colloidal silica, when maintained within a proper micron size, has the unique property of permitting infusion applied treatment products to be made which are far more efficient than any emulsifiable product presently known to us. Colloidal silica when utilized in the present invention acts as a physical consistency conditioner permitting a wide range of viscosities and gels in treatment products. The consistencies in treatment products that can be obtained by the use of colloidal silica allow for easy administration of the product and proper dispersion of all ingredients to be maintained during its storage.

As far as is known, colloidal silica has not been used heretofore in infusion applied treatment products.

Advantageously colloidal silica has been found to have a selective affinity in aqueous systems which permits it to be easily extracted from suspension in an oil. Thus, the colloidal silica rapidly migrates from a colloidal suspension in an anhydrous organic liquid into an aqueous liquid, i.e., milk in an infected animal's mammary gland.

It has also been found that colloidal silica has the unexpected facility of carrying other solid ingredients with it when it transfers from the oil carrier to the aqueous liquid.

A type of colloidal silica which has been found to be suitable for mastitis and metritis treatment preparations is silica which is known as vapor phase or pyrogenic silica. Vapor phase silica ($SiO_2$) is produced by first vaporizing pure silicon tetrachloride and then transporting it to a furnace where a hydrogen flame is burning. The water vapor formed by the hydrogen flame reacts with the silicon tetrachloride producing silicon dioxide and hydrogen chloride according to the following equation:

$$SiCl_4 + 2\ H_2O\ SiO_2 + HCl$$

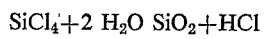

The absorbed hydrogen chloride is driven off by heat and steam in a calciner, after which the silica is blown into storage hoppers from where it is bagged for shipment or stored for use.

In accordance with the present invention, it has been found that vapor phase silica having a micron size from about 0.008 to 0.02 micron is particularly advantageous for use in disease treatment compositions applied by infusion. Colloidal silica having a micron size up to 3.0 is also useful, but the finer silica is preferred.

In preparing infusion applied compositions for use in the present invention, substantially non-porous silica is advantageously used. Porous silica is hollow-bodied and has a large combined surface area, internal and external, with low weight. However, such porous silica, which has relatively large substantially internal surface, has a tendency to retain some of active therapeutic ingredients of the treatment composition by the process of adsorption, thus, preventing them from being used for therapeutic purposes. Also, porous silica has a greater oil absorbing capacity than does non-porous silica. Due to its absorbing characteristic the porous silica tends to thicken an oil base by retaining oil within the open areas of the porous silica. The oil retained in the open areas also retains some of the therapeutic ingredients when the composition is infused into an aqueous system such as the milk in a mammary gland.

Non-porous silica in colloidal suspension in an oil base is believed to form a web-like pattern in the oleaginous system with the medicaments dispersed between the silica particles. When the non-porous colloidal silica composition is infused into an aqueous system the silica and other fine solids (medicaments) are quickly carried from the oleaginous phase to the aqueous phase.

Colloidal silica due to its selective affinity for aqueous systems is easily extracted from the oleaginous system into the aqueous phase. In so transferring, the silica has surprisingly been found to carry with it other solid ingredients from the oleaginous system to the aqueous medium into which the composition has been infused.

The colloidal silica acts to achieve efficient activation of the therapeutic ingredients of the infusion applied composition by aiding their rate of ionization which is brought about by the aforementioned effect of colloidal silica to effectuate accelerated and complete release of the therapeutic ingredients from an electrically non-conductive carrier base into an aqueous suspension.

The colloidal silica as used in the present invention has the capacity of carrying sparingly soluble or even insoluble particles into suspension and fine non-cohesive particle dispersion in the increasing volume of liquid such as milk which is gradually produced in the mammary gland of an animal. Because of the greater exposed surface area of the particles, their dispersion shows a marked difference in physical properties such as displaying increased particle velocity and greater particle reactivity. As a result there is intense and constantly active contact of the therapeutic particles with infected tissue areas, thus permitting most favorable conditions for maximum and quickest therapeutic action. To facilitate the preparation of the infusion applied treatment product it is preferable generally to use the finely powdered forms of therapeutic materials such as micronized powders, particle sizes of which range from two to ten microns. As stated previously the colloidal silica is also finely powdered.

Advantageously the silica is of a highly purified type and very good results have been obtained with a vapor phase material having a silica content of about 99% and substantially free of impurities and moisture. Such a silica material having a micron size in the range of about 0.008 to 0.02 micron has a bulk density of about 2.3 pounds cubic feet. This low bulk density shows that there is a small degree of particle to particle contact with a relatively large external surface on each particle. It is estimated that one gram of such silica material provides about 200 to 325 square meters of surface area. Thus, colloidal silica as described herein is a very light yet solid material. Due to its lightness the colloidal silica physically aids other finely divided solids in suspension in being spread over much larger areas than was obtainable by other known physical means.

Because of the amorphous structure of the colloidal silica it is substantially devoid of abrasiveness and irritating effects. Further, due to its substantially solid surface it does neither retain by absorption nor absorb the therapeutic materials in the treatment composition. Also, since it is substantially inert it does not react chemically with the therapeutic materials and reduce their stability and potency.

In preparing mastitis and metritis treatment infusion compositions it has been found advantageous to use mineral oil for the carrier base and to treat it with the colloidal silica before introducing the therapeutic materials. Good results have been obtained by first preheating the mineral oil to a temperature of about 160–170° F. It has been found that this preheating of the mineral oil facilitates the escape of entrapped air from the mixture after the colloidal silica is added to it. In determining the quantity relationship of colloidal silica to mineral oil it has been found that a unit weight of colloidal silica to a unit volume of oil base aids in formulating proper compositions. As discussed in this specification a 1% silica-oil solution formulation means 10 grams of colloidal silica is mixed into 1 litre of oil base. In preparing a 2% base, 20 grams of colloidal silica are introduced into 1 litre of preheated oil.

Dispersion of the silica is accomplished by mechanical agitation such as a mixer or with small quantities in a blender. The degree of mechanical agitation has been found to affect the consistency of the mixture. The longer the period and greater the velocity of agitation the greater the viscosity of the resulting mixture. If sufficiently agitated the mixture of colloidal silica and mineral oil will become a thixotropic gel. The consistency of the mixture may be varied as desired in each particular case.

Suitable and selected therapeutic ingredients are added to the colloidal silica-mineral oil mixture. These are usually antibiotics, sulfonamide compounds, steroids, and mineral salts. Among these therapeutic ingredients are antibiotics such as procaine pencillin G, crystalline potassium pencillin G, dihydrostreptomycin sulphate, and neomycin sulphate; sulfonamide compounds such as sulfanilamide, sulfathiazole, sulfamerazine, phthalylsulfacetamide and the like; steroids such as hydrocortisone, prednisolone and sex hormones; and mineral salts such as cobaltous sulphate. It is advantageous that these ingredients be prepared in very fine particle form as dry micronized powders. By having the dry ingredients in very fine particle form they make a smoother blend with the colloidal silica conditioned oil base and their physical properties are more easily activated by the colloidal silica.

The dosage volume of mastitis and metrities treatment infusions generally range from about 10 to 30 cc. In such dosages the ratio of solids (gram weight) to liquid (litre volume) ranges from about 1:3 to 1:20, in accordance with the concentration of therapeutic ingredients and degree of treatment necessary.

It is usually advantageous that the colloidal silica be the primary agent for conditioning the mineral oil base since the addition of materials helping the formation of water-in-oil emulsions have a tendency to reduce the efficiency of the silica and to retard its medicament releasing effect from oil to water, i.e., from the oil base to the milk in the mammary gland.

The following are typical examples of mastitis and metritis treatment preparations in accordance with the present invention:

*Example 1*

| | |
|---|---|
| Crystalline potassium pencillin G, units | 100,000 |
| Dihydrostreptomycin sulfate (as base), mg. | 150 |
| Neomycin sulfate (as base), mg. | 25 |
| Sulfanilamide, mg. | 500 |
| Chlorobutanol, mg. | 50 |
| Cobalt sulfate, mg. | 10 |

Two percent weight/volume colloidal silica mineral oil base sufficient to make a total mixture of 12 grams, the colloidal silica having a particle size about 0.008 micron.

In preparing 12 kilos of this composition 14 litres of a light mineral oil was first preheated between 160–170° F. To this was added 280 grams of colloidal silica having a particle size of about 0.008 micron to give a 2% oil base mixture. The silica-mineral oil mixture was mechanically agitated until the silica was substantially completely suspended and a thixotropic gel was produced.

With the silica-oil base prepared the following quantities of material were measured out.

| | Gms. |
|---|---|
| Crystalline potassium penicillin G | 69.4 |
| Dihydrostreptomycin sulfate (740 mg. base per gram) | 212.8 |
| Neomycin sulfate (654 mg. base per gram) | 42.1 |
| Sulfanilamide | 500 |
| Cobalt sulfate | 10 |
| Chlorobutanol anhydrous | 50 |

All the dry materials were finely powdered to a particle size range of 2 to 4 microns and the chlorobutanol was dissolved in a portion of the previously prepared silica-oil base, about 2 kilos being satisfactory. During this step heat was applied to speed up the dissolution of the chlorobutanol. When the chlorobutanol was dissolved heat was removed and another 5 kilos of the silica-oil base was added and stirred until cooled to about room temperature.

To this 7 kilos of base and chlorobutanol, the dry ingredients in fine powdered form were added and worked in until the resultant mixture was smooth and free of lumps. The remainder of the silica-oil base to make up 12 kilos was then added and mixing continued until the mix was homogeneous and free of air bubbles.

From this batch individual single doses of about 12 grams per dose in separate single dose disposable syringes were prepared.

This example contains about 7.3% solids in addition to the colloidal silica or about 9.3% total solids.

*Example 2*

Another example containing about 13.25% solids in addition to the colloidal silica or about 15.25% total solids is as follows:

| | |
|---|---|
| Crystalline potassium penicillin G, units | 100,000 |
| Dihydrostreptomycin sulfate (as base), mg. | 250 |
| Neomycin sulfate (as base), mg. | 50 |
| Hydrocortisone acetate, mg. | 20 |

| | |
|---|---|
| Sulfanilamide, mg. | 500 |
| Sulfathiazole, mg. | 500 |
| Chlorobutanol, mg. | 50 |
| Cobalt sulfate, mg. | 10 |

Two percent colloidal silica mineral oil base sufficient to make total dosage of 12 grams, the silica having a particle size of about 0.008 micron.

*Example 3*

Another example containing about 26% solids in addition to the colloidal silica or about 28% total solids on the basis of weight of solids in grams to volume of liquid in litres made up as a 14 grams dose is as follows:

| | |
|---|---|
| Crystalline potassium penicillin G, units | 100,000 |
| Dihydrostreptomycin sulfate (as base), mg. | 250 |
| Neomycin sulfate (as base), mg. | 100 |
| Sulfanilamide, mg. | 2,300 |
| Sulfathiazole, mg. | 500 |
| Phthalysulfacetamide, mg. | 200 |
| Chlorobutanol, mg. | 50 |
| Cobalt sulfate, mg. | 10 |

Two percent colloidal silica mineral oil base sufficient to make a total dosage of 14 grams, the silica having a particle size of about 0.008 micron.

A dosage according to one of the above examples is usually sufficient for a single mastitis treatment. However, where necessary the treatment may be repeated as dictated by the circumstances in each case and the decision of the attending veterinarian.

In applying the treatment product the selected formula and dosage is placed in a syringe and infused into the mammary gland of the infected animal. In actual practice cows suffering from mastitis and metritis have been treated with each of the compositions set forth in the examples herein. The individual doses were placed in syringes and injected into the infected environment of the cows and the composition functioned therapeutically as discussed hereinbefore.

It will be seen that hereinabove various embodiments of the present invention have been described for the purpose of illustration. The novel composition of matter is is a broadly new infusion applied treatment article, and the method of treatment is also new. Prior to the present invention as far as it is known there was no infusion applied preparations or methods which had such a high degree of effectiveness. As far as it is known the present invention involves the first infusion applied composition of matter and treatment which contains colloidal silica functioning as a therapeutic material release mechanism and promoter of such physical conditions condusive for the therapeutic material to act to the fullest of its pharmacologically established potential.

While in the examples herein mineral oil has been used as the preferred embodiment, it is to be understood that other oils, such as animal and vegetable oils, may be used for the base material.

Having described various embodiments of the invention, for purposes of illustration rather than limitation, the following is claimed:

1. A composition of matter for use by infusion in the treatment of infections in mammals comprising a thixotropic mixture of a medicament and an oil base vehicle for the medicament, said oil base including colloidal silica in suspension therein, said colloidal silica having a micron size in the range of about .008 to 3.0 microns and said silica being substantially non-porous and of amphorous structure.

2. A method of treating mastitis and metritis infections in mammals comprising the steps of infusing a selected dosage into the area of infection to be treated, the dosage comprising a thixotropic mixture of an oil base vehicle containing a medicament and colloidal silica, said colloidal silica in suspension therein, said silica having a micron size in the range of about .008 to 3.0 microns and being substantially non-porous and of amorphous structure.

3. A composition of matter for use by infusion in the treatment of mastitis and metritis in domesticated animals comprising a thixotropic mixture of a medicament, an oil base carrier for the medicament, said oil base selected from the group consisting of mineral, animal and vegetable oils, and colloidal, non-porous and amorphous silica having a micron size up to 3.0 in suspension in said carrier.

4. A composition of matter for use by infusion in the treatment of mastitis and metritis in domesticated animals comprising a medicament blended into a thixotropic gel formed from an oil base vehicle with colloidal silica suspended therein, said silica being of the vapor phase type, substantially non-porous, with an amphorous structure and having a micron size in the range of about 0.008 to 0.02, said silica and said oil base vehicle being combined in the ratio ranging from about 20 to 40 grams of silica to about 1 litre of oil base carrier.

5. A composition of matter for use by infusion in the treatment of mastitis and metritis in domesticated animals as defined in claim 4 wherein the ratio of total solids in the composition to total liquid volume in the composition is in the range from about 1:3 to 1:20 weight (in grams) volume (in liters).

6. A method of treating bovine mastitis and metritis comprising the steps of infusing a treatment dosage into the infected area to be treated, the dosage comprising a thixotropic mixture of a medicament and a combination of an oil base vehicle with colloidal, non-porous and amorphous silica having a micron size up to 3.0 particles suspended therein, said medicament including finely powdered therapeutic particles, said colloidal silica acting as a physical conditioning agent to give desirable consistency to said medicament, to carry its therapeutic particles from the oil base vehicle and to promote such physical effects conducive for the therapeutic ingredients in the medicament to act to the fullest of their pharmacologically established potential.

7. A method of treating mastitis in cows comprising essentially the steps as set forth in claim 6 wherein the oil base vehicle is mineral oil.

References Cited by the Examiner

UNITED STATES PATENTS

| | | | |
|---|---|---|---|
| 2,573,650 | 10/1951 | Peterson | 167—63 XR |
| 2,952,584 | 9/1960 | Whitmire | 167—53.2 |
| 3,004,888 | 10/1961 | Conover | 167—53.2 |

OTHER REFERENCES

Lloyd, Chem. Abst., vol. 46, 1952, page 2239a; abstract of Texas Druggist, vol. 71, No. 5, pp. 33-34 (1951).

Lloyd, The Texas Druggist, vol. 71, No. 5, 1951, page 1951.

Prout, J. of the American Pharmaceutical Ass'n., Practical Pharm. Ed., vol. 2, 1941, pages 431–435.

JULIAN S. LEVITT, *Primary Examiner.*

FRANK CACCIAPAGLIA, JR., *Examiner.*